(12) United States Patent
Zhang et al.

(10) Patent No.: US 11,415,236 B1
(45) Date of Patent: Aug. 16, 2022

(54) GAS PRESSURE REGULATING DEVICE

(71) Applicant: NINGBO WANAN CO., LTD, Ningbo (CN)

(72) Inventors: Feng Zhang, Ningbo (CN); Yunnan Wei, Ningbo (CN); Yanhua Wang, Ningbo (CN); Hongbin Ren, Ningbo (CN)

(*) Notice: Subject to any disclaimer, the term of this patent is extended or adjusted under 35 U.S.C. 154(b) by 0 days.

(21) Appl. No.: 17/349,466

(22) Filed: Jun. 16, 2021

(30) Foreign Application Priority Data

Apr. 20, 2021 (CN) .......................... 202110421568.0

(51) Int. Cl.
  *F16K 17/04* (2006.01)
  *F16K 15/03* (2006.01)
(52) U.S. Cl.
  CPC ........ *F16K 17/0453* (2013.01); *F16K 15/033* (2013.01)
(58) Field of Classification Search
  CPC ............. F16K 31/1262; F16K 17/0453; F16K 15/033; F16K 31/402
  See application file for complete search history.

(56) References Cited

U.S. PATENT DOCUMENTS

| 4,301,992 A | * | 11/1981 | Karbo | .................. F16K 31/402 |
| | | | | 251/30.02 |
| 2011/0297255 A1 | * | 12/2011 | Weingarten | ............. F16K 27/00 |
| | | | | 137/553 |
| 2018/0119586 A1 | * | 5/2018 | Bock | .................. G05D 16/0641 |

* cited by examiner

*Primary Examiner* — P. Macade Nichols
(74) *Attorney, Agent, or Firm* — W&K IP

(57) ABSTRACT

A gas pressure regulating device is provided which comprises an upper housing and a lower housing, a pressure regulation cavity is disposed between the upper housing and the lower housing, a diaphragm assembly is disposed in the pressure regulation cavity, a gas inlet and a valve port for communicating the gas inlet with the pressure regulation cavity are disposed at one end of the lower housing. The gas pressure regulating device provided in the present invention has a simpler structure and fewer parts and is capable of effectively lowering the risks of dangerous accidents such as product leakage resulting from part failure, thus effectively ensuring stable pressure regulation performance.

9 Claims, 8 Drawing Sheets

GAS PRESSURE REGULATING DEVICE

CROSS-REFERENCE TO RELATED APPLICATIONS

This application claims priority to Chinese Patent Application No. 202110421568.0 with a filing date of Apr. 20, 2021. The content of the aforementioned application, including any intervening amendments thereto, are incorporated herein by reference.

TECHNICAL FIELD

The present invention relates to the field of gas pressure regulation, and in particular to a gas pressure regulating device.

BACKGROUND

Gas pressure regulating device (also known as gas pressure regulating valve) is a straight-rod type or lever-type device which regulates pressure by pressure difference feedback control. Gas in a gas cylinder is liquefied at a high pressure and thus must be depressurized before being introduced into a gas stove for combustion. The working principle is as follows: a high pressure medium is injected into a larger cavity for depressurization through an aperture, and the depressurization is actually realized by interception. One of two sides of a diaphragm or piston is an outlet cavity and the other receives a pressure applied by human. Further, a valve stem controlling the size of the aperture is connected with the diaphragm (piston). In this way, once under a constant pressure, a pressure of the outlet cavity will be always equal to the constant pressure. The constant pressure may be supplied by a spring or gas source or hydraulic source.

At present, domestic and foreign manufacturers mostly adopt a lever-type depressurization structure to drive a diaphragm assembly to move, so as to realize pressure regulation of a pressure regulation cavity and finally enable an outlet end to output at a stable pressure. Thus, gas depressurization function is realized. The existing lever-type structure is as shown in FIG. 1, in which a regulation mechanism comprises a plurality of internal control parts such as a lever cushion 100, a lever pin 110, a lever 120, a diaphragm bolt 130 and a pressing nut 140. Therefore, the existing pressure regulation structure has the following disadvantages.

1. The product has many parts, resulting in higher costs of part purchase and part assembly than the technical solution.
2. There are errors in part mating, causing deviation of product performance. Further, phenomena such as product leakage and function failure may also occur due to the deviation of part size, assembly error, and the like.

SUMMARY

To solve the technical problems and overcome the defects of the prior art, the present invention provides a gas pressure regulating device which has a simpler structure and fewer parts and is capable of effectively lowering the risks of dangerous accidents such as product leakage resulting from part failure, thus effectively ensuring stable pressure regulation performance.

The technical solution adopted by the present invention is to provide a gas pressure regulating device. The device comprises an upper housing and a lower housing, a pressure regulation cavity is disposed between the upper housing and the lower housing, a diaphragm assembly is disposed in the pressure regulation cavity, a gas inlet and a valve port for communicating the gas inlet with the pressure regulation cavity are disposed at one end of the lower housing, a gas outlet in communication with the pressure regulation cavity is disposed at the other end of the lower housing, a first supporting point is disposed at an end of the lower housing close to the valve port, a second supporting point is disposed at a position of the upper housing opposing the first supporting point, one end of the diaphragm assembly passes through a passage between the first supporting point and the second supporting point to connect with a side wall of one end of the pressure regulation cavity, and the other end of the diaphragm assembly is connected at a side wall of the other end of the pressure regulation cavity; the diaphragm assembly may rotate around the first supporting point or the second supporting point to regulate an openness of the valve port, and an elastic resetting member is disposed between an end of the diaphragm assembly away from the valve port and the upper housing.

Compared with the prior art, the present invention has the following advantages.

In the structure of the present invention, the corresponding first supporting point and corresponding second supporting point are disposed on the lower housing and the upper housing respectively to support the rotation of the diaphragm assembly. Compared with the prior art, product parts and part assembly procedures are reduced, costs are effectively lowered, and production efficiency is improved in the structure of the present invention. In addition, due to fewer product parts and lower safety risks resulting from part defects and assembly errors, the safety performance and the pressure regulation stability of the product can be effectively improved.

In an improvement, a mounting step extending toward the pressure regulation cavity is disposed at an end of the lower housing close to the gas inlet, and the valve port is convexly disposed at one end of the mounting step close to the gas inlet; the first supporting point is convexly disposed at the other end of the mounting step. In this improved structure, the corresponding mounting step is disposed in the lower housing, so that the valve port and the first supporting point can be processed more conveniently, thereby ensuring more flexible rotation of the diaphragm assembly and improving the stability of pressure regulation.

In a further improvement, the first supporting point and the second supporting point are staggeredly disposed along an inlet incoming direction, and the second supporting point is located between the valve port and the first supporting point along the inlet incoming direction. In this improved structure, the diaphragm assembly can rotate upward or downward in an optimal state due to the staggered design of the first supporting point and the second supporting point.

Preferably, the diaphragm assembly comprises a rubber diaphragm and a diaphragm cushion, and the diaphragm cushion is covered on the top of the rubber diaphragm; an area of the diaphragm cushion is smaller than that of the rubber diaphragm, and a circumferential outer edge of the rubber diaphragm is connected at a side wall of the pressure regulation cavity. In this structure, the rubber diaphragm is mainly used to realize pressure transfer and pressure balancing between upper and lower regions in the pressure regulation cavity, and the diaphragm cushion is used to support the rubber diaphragm to facilitate the rotation of the entire diaphragm assembly around a corresponding supporting point.

In a further improvement, a limiting boss is convexly disposed at a lower surface of an end of the diaphragm cushion close to the gas outlet, and a limiting groove mated with the limiting boss is disposed on the rubber diaphragm; further, at least one locating assembly is disposed between the rubber diaphragm and the diaphragm cushion. This improved structure enables the rubber diaphragm and the diaphragm to be more structurally stable after being assembled, and enables the entire diaphragm assembly to rotate around a corresponding supporting point more stably and flexibly.

Preferably, the locating assembly comprises a locating column integrally formed on the rubber diaphragm, and a locating hole mated with the locating column is disposed on the diaphragm cushion. In this structure, the locating structure is simple, stable in locating, easy to process and low in costs.

In a further improvement, the circumferential outer edge at a side of the diaphragm cushion away from the rubber diaphragm is folded upward to form a retaining rim, and a reinforcing protrusion rib is disposed in the retaining rim on the diaphragm cushion. In this structure, the retaining rim and the reinforcing protrusion rib are both disposed to effectively increase the structural strength of the diaphragm cushion, thereby ensuring that the entire diaphragm assembly can rotate around a corresponding supporting point stably.

In a further improvement, a first locating groove is formed by recessing a side of the limiting boss away from the rubber diaphragm, a second locating groove corresponding to the first locating groove is disposed at an inner sidewall of the upper housing, and both ends of the elastic resetting member are fitted into the first locating groove and the second locating groove respectively. In this improved structure, the elastic resetting member can be mounted and located more stably and reliably, thereby ensuring more smooth rotation of the diaphragm assembly.

Preferably, the elastic resetting member is a cylindrical spring. In this structure, the cylindrical spring is used as the resetting member, which is simple in structure and stable in elastic force, so that the diaphragm assembly can realize stable pressure regulation for the upper region and the lower region of the pressure regulation cavity.

Numerals of the drawings are described as follows:
1—upper housing, 2—lower housing, 2.1—gas inlet, 2.2—gas outlet, 2.3—valve port, 3—pressure regulation cavity, 4—diaphragm assembly, 4.1—rubber diaphragm, 4.1.1—limiting groove, 4.1.2—locating column, 4.2—diaphragm cushion, 4.2.1—limiting boss, 4.2.2—locating hole, 4.2.3—retaining rim, 4.2.4—reinforcing protrusion rib, 5—first supporting point, 6—second supporting point, 7—elastic resetting member, 8—mounting step, 9—first locating groove, 10—second locating groove, and 20—gas inlet connector.

EMBODIMENTS

The present invention will be further described below in combination with accompanying drawings and specific embodiments.

In the descriptions of the present invention, it is to be noted that orientations or positional relationships indicated by terms such as "outer end", "inner sidewall", "bottom", "lower end", "upper end", "middle" and "outer sidewall" are orientations or positional relationships shown based on the drawings, and are used to facilitate describing the present invention and simplify the descriptions rather than indicate or imply that the indicated devices or elements must have a particular orientation, or be constructed or operated in a particular orientation. Therefore, such terms shall not be understood as limiting of the present invention.

In the descriptions of the present invention, it is to be noted that unless otherwise clearly stated or defined, the term "connect" shall be understood in a broad sense, for example, may be fixed connection, or detachable connection, or connected into one piece; or may be mechanical connection, or electrical connection; or may be direct connection or indirect connection through an intermediate medium, or may be internal communication between two elements. Those of ordinary skill in the art may understand the specific meanings of the above terms in the present invention according to actual situations.

Figure 1:
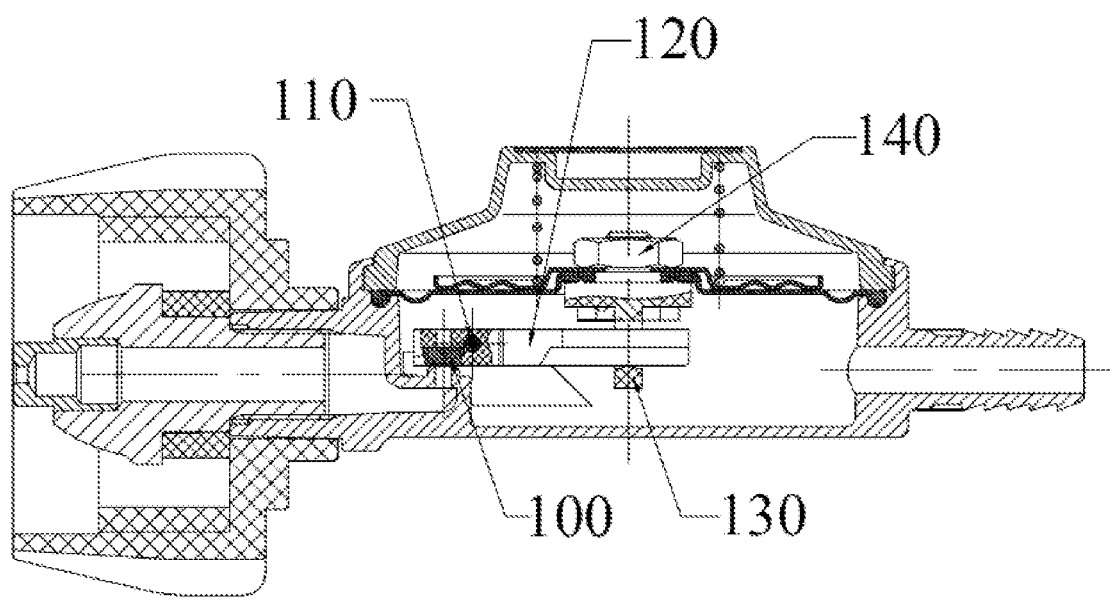
FIG. 1 illustrates a structure of a gas pressure regulating device in the prior art.
Figure 2:
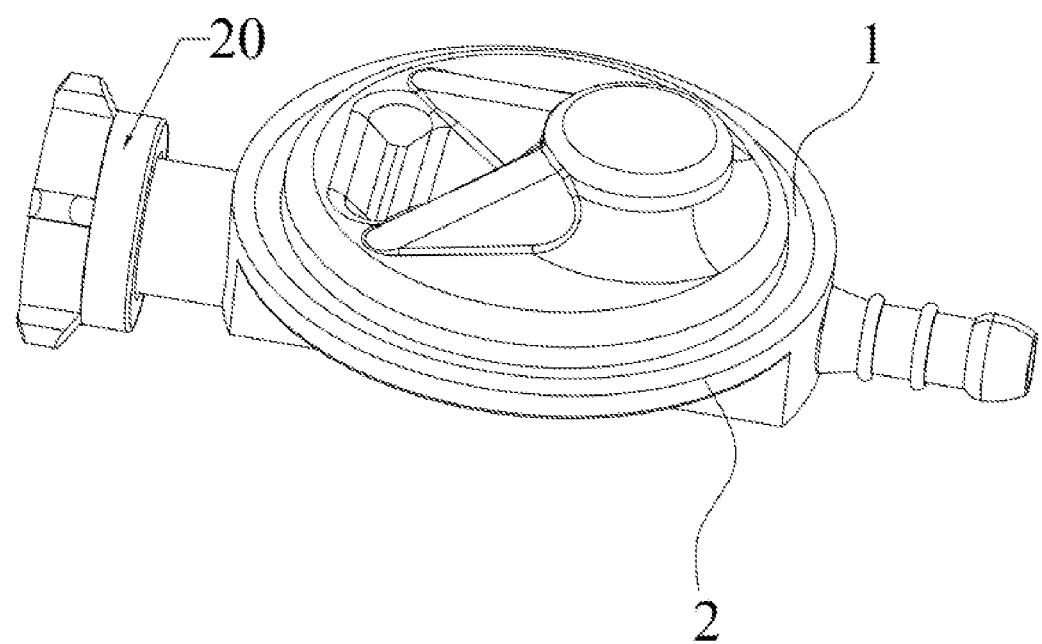
FIG. 2 is a structural schematic diagram of a gas pressure regulating device according to an embodiment of the present invention.
Figure 3:
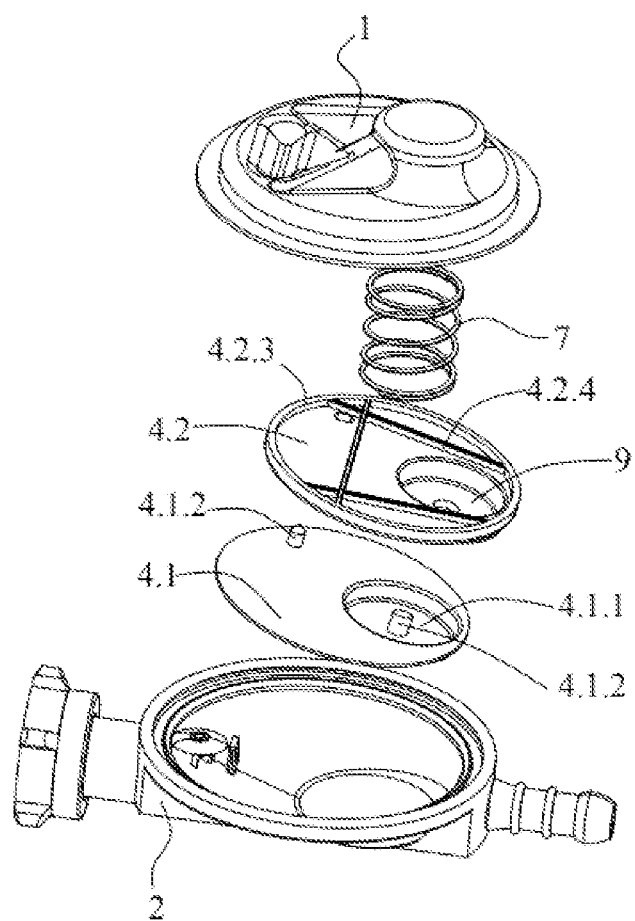
FIG. 3 is an exploded view of a gas pressure regulating device according to an embodiment of the present invention.
Figure 4:
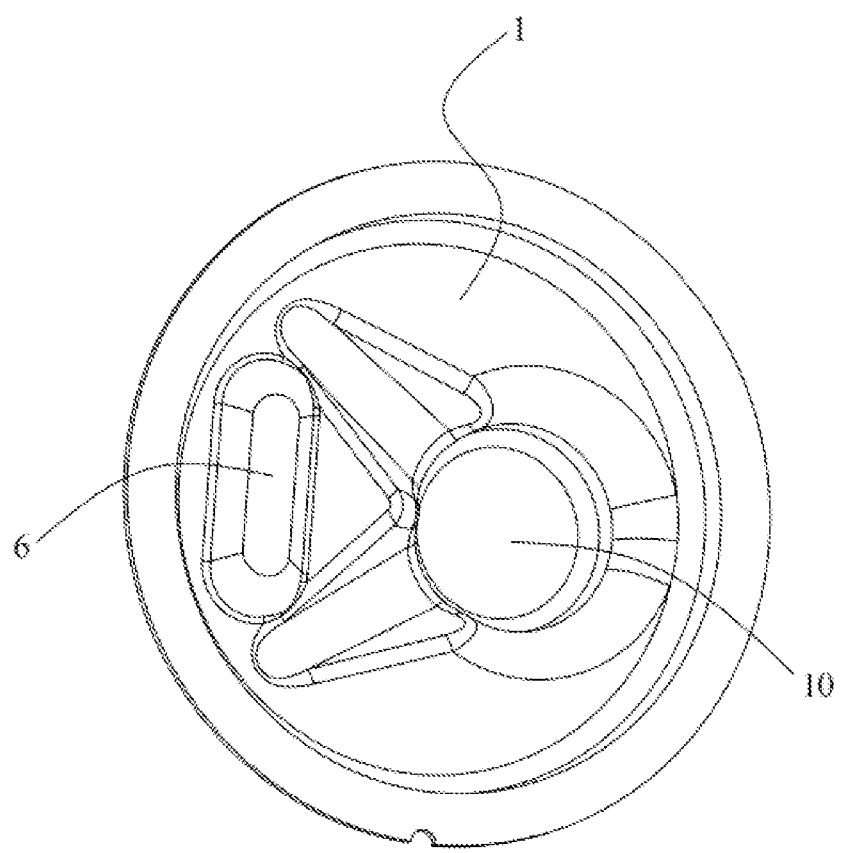
FIG. 4 is a structural schematic diagram of an upper housing according to an embodiment of the present invention.
Figure 5:
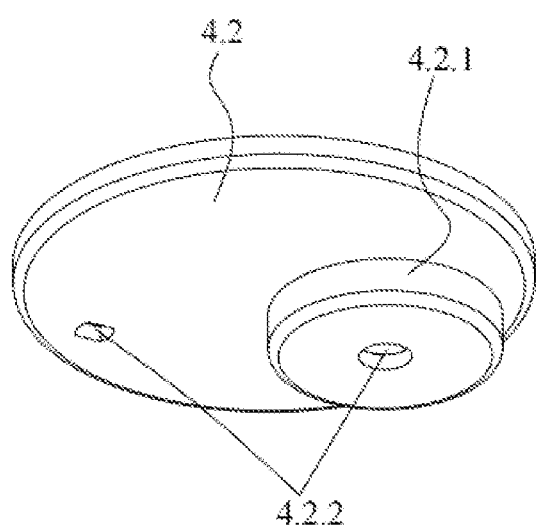
FIG. 5 is a structural schematic diagram of a diaphragm cushion according to an embodiment of the present invention.
Figure 6:
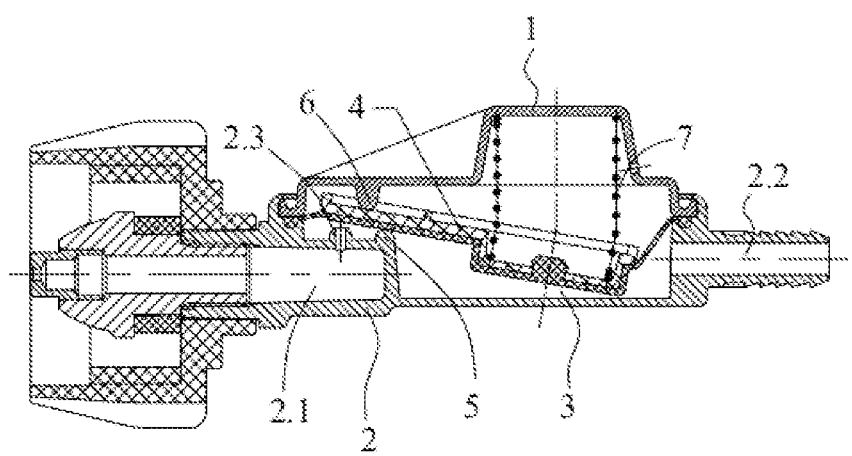
FIG. 6 is a semi-sectional structural schematic diagram of a gas pressure regulating device according to an embodiment of the present invention (valve port is in fully opened state).

As shown in FIGS. 2, 3 and 6, the present invention provides a gas pressure regulating device. The device comprises an upper housing 1 and a lower housing 2, a mounting cavity with an upper opening is disposed on the lower housing 2, the upper housing 1 is covered on the top of the mounting cavity to form a pressure regulation cavity 3 between the upper housing 1 and the lower housing 2, and a diaphragm assembly 4 is disposed in the pressure regulation cavity 3; in addition, a gas inlet 2.1 and a valve port 2.3 that is used for communicating the gas inlet 2.1 with the pressure regulation cavity 3 and has an upward opening are disposed at one end of the lower housing 2, and a gas outlet 2.2 in communication with the pressure regulation cavity 3 is disposed at the other end of the lower housing 2; a first supporting point 5 is disposed at an end of the lower housing 2 close to the valve port 2.3 and specifically the first supporting point is also convexly disposed upward; a second supporting point 6 convexly disposed downward is disposed at a position of the upper housing 1 opposing the first supporting point 5, and a passage is disposed between the first supporting point 5 and the second supporting point 6; one end of the diaphragm assembly 4 passes through the passage between the first supporting point 5 and the second supporting point 6 to connect with a side wall of one end of the pressure regulation cavity 3, and the other end of the diaphragm assembly 4 is connected at a side wall of the other end of the pressure regulation cavity 3; an end of the diaphragm assembly 4 close to the valve port 2.3 may rotate around the first supporting point 5 or the second supporting point 6 to adjust an openness of the valve port 2.3, and an elastic resetting member 7 is disposed between an end of the diaphragm assembly 4 away from the valve port 2.3 and the upper housing 1. As shown in FIG. 1, during actual use, a special gas inlet connector 20 is usually connected at the gas inlet 2.1 of the lower housing 2 for rapid connection with a gas cylinder.

Specifically, the pressure is regulated through the following process.

When there is no inlet gas pressure at the gas inlet 2.1, the elastic resetting member 7 is used to drive an end of the diaphragm assembly 4 away from the valve port 2.3 to rotate downward around the first supporting point 5, so that an end of the diaphragm assembly 4 close to the valve port 2.3 moves away from the valve port 2.3 until the valve port 2.3 is in a maximum opening state, as shown in FIG. 6.

Figure 7:
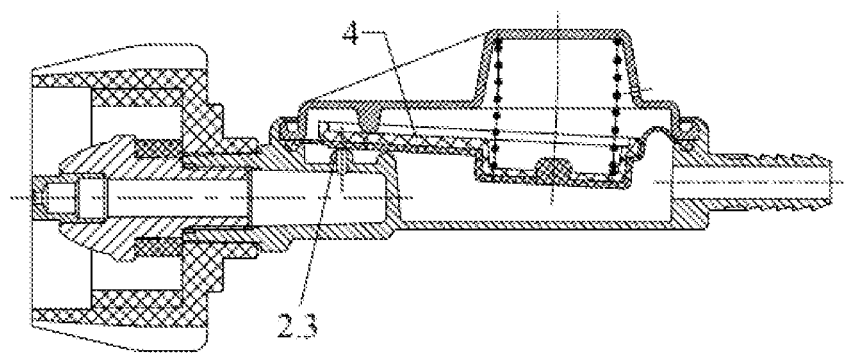
FIG. 7 is a semi-sectional structural schematic diagram of a gas pressure regulating device according to an embodiment of the present invention (in a pressure regulation state).

When gas is input into the gas inlet 2.1 and gas is output from the gas outlet 2.2, the gas enters the pressure regulation cavity 3 through the valve port 2.3, and the gas pressure in the pressure regulation cavity 3 increases. At this time, the gas pressure in the pressure regulation cavity 3 is smaller than the elastic force of the elastic resetting member 7 and thus insufficient to push up the entire diaphragm assembly 4. At this time, the end of the diaphragm assembly 4 away from the valve port 2.3 rotates upward around the first supporting point 5, so that the end of the diaphragm assembly 4 close to the valve port 2.3 moves toward the valve port 2.3 and the valve port 2.3 will have a smaller openness, thereby reducing flow of the gas entering the pressure regulation cavity 3; when the inlet gas flow continues decreasing, the pressure in the pressure regulation cavity 3 decreases accordingly; at this time, under the action of the elastic resetting member 7, the end of the diaphragm assembly 4 away from the valve port 2.3 is rotated downward around the first supporting point 5 again, so that the end of the diaphragm assembly 4 close to the valve port 2.3 moves away from the valve port 2.3 to gradually increase the openness of the valve port 2.3; in this way, the cyclic reciprocating actions implement the gas depressurization function and realizes stable gas output of the gas outlet 2.2, as shown in FIG. 7.

Figure 8:
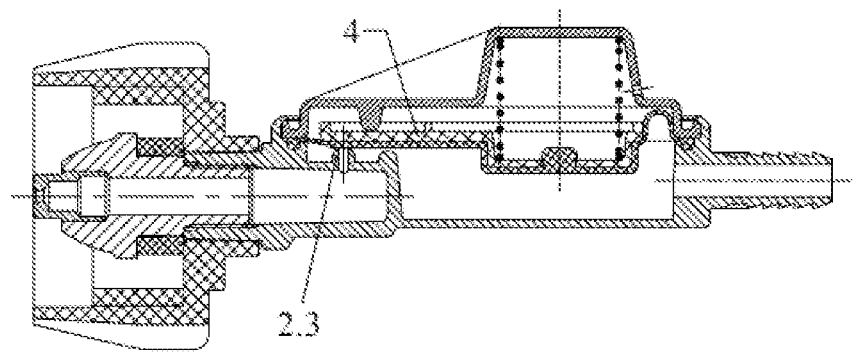
FIG. 8 is a semi-sectional structural schematic diagram of a gas pressure regulating device (valve port is in closed state) according to an embodiment of the present invention.

When there is an inlet gas pressure at the gas inlet 2.1 and no gas is output from the gas outlet 2.2, the gas pressure in the pressure regulation cavity 3 increases to a set pressure value. At this time, the gas pressure in the pressure regulation cavity 3 is sufficient to push up the entire diaphragm assembly 4, and the end of the diaphragm assembly 4 away from the valve port 2.3 rotates upward around the second supporting point 6, so that the end of the diaphragm assembly 4 close to the valve port 2.3 moves toward the valve port 2.3 until the diaphragm assembly 4 fully blocks an upper end surface of the valve port 2.3. At this time, the valve port 2.3 is in a closed state, and the pressure in the pressure regulation cavity 3 no longer increases, as shown in FIG. 8.

As shown in FIG. 6, a mounting step 8 extending toward the pressure regulation cavity 3 is disposed at an end of the lower housing 2 close to the gas inlet 2.1, and the valve port 2.3 is convexly disposed at an upper end surface of one end of the mounting step 8 close to the gas inlet 2.1; correspondingly, the first supporting point 5 is convexly disposed at an upper end surface of the other end of the mounting step 8. Therefore, when the diaphragm assembly 4 rotates around the first supporting point 5, the openness of the valve port 2.3 can be better controlled.

Furthermore, in this embodiment, the first supporting point 5 and the second supporting point 6 are staggeredly disposed along an gas incoming direction, that is, the first supporting point 5 and the second supporting point 6 are not in a same plane in a vertical direction, and the second supporting point 6 is located between the valve port 2.3 and the first supporting point 5 along the gas incoming direction. In the structure of this embodiment, the first supporting point 5 and the second supporting point 6 are staggeredly disposed. When gas is output from the gas outlet 2.2, the first supporting point 5 plays a role in the rotation of the diaphragm assembly 4. The relative positions of the first supporting point 5 and the valve port 2.3 may be adjusted according to flow requirements to increase the openness, so as to satisfy flow output requirements. In this structure, theoretically, when the first supporting point 5 is farther away from the valve port 2.3, the openness of the valve port 2.3 will become larger when the end of the diaphragm assembly 4 away from the valve port 2.3 rotates downward, thereby better satisfying the flow output requirements. When the valve port 2.3 is to be closed, the second supporting point 6 plays a role in the rotation action of the diaphragm assembly 4. the relative positions of the second supporting point 6 and the valve port 2.3 may be adjusted to an optimal lever ratio (theoretically, a closing pressure will be lower when the second supporting point 6 is closer to the valve port 2.3), so as to control the closing pressure as low as possible. In this case, when the flow and the closing pressure have redundancy after satisfying requirements, the size of the housing may be minimized to reduce materials costs and other costs.

Preferably, in this embodiment, as shown in FIG. 3 and FIG. 6, the diaphragm assembly 4 comprises a rubber diaphragm 4.1 and a diaphragm cushion 4.2, and the diaphragm cushion 4.2 is covered on the top of the rubber diaphragm 4.1; an area of the diaphragm cushion 4.2 is smaller than that of the rubber diaphragm 4.1, and a circumferential outer edge of the rubber diaphragm 4.1 is connected at a side wall of the pressure regulation cavity 3.

A limiting boss 4.2.1 is convexly disposed at a lower surface of an end of the diaphragm cushion 4.2 close to the gas outlet 2.2, and a limiting groove 4.1.1 mated with the limiting boss 4.2.1 is disposed on the rubber diaphragm 4.1; further, at least one locating assembly is disposed between the rubber diaphragm 4.1 and the diaphragm cushion 4.2. Specifically, the locating assembly comprises a locating column 4.1.2 integrally formed on the rubber diaphragm 4.1, and a locating hole 4.2.2 mated with the locating column 4.1.2 is disposed on the diaphragm cushion 4.2. A first locating groove 9 is formed by recessing a side of the limiting boss 4.2.1 away from the rubber diaphragm 4.1, a second locating groove 10 corresponding to the first locating groove 9 is disposed at an inner side wall of the upper housing 1, and both ends of the elastic resetting member 7 are fitted into the first locating groove 9 and the second locating groove 10 respectively. Preferably, the elastic resetting member 7 is a cylindrical spring. In other embodiments, the elastic resetting member 7 may also be a rubber corrugated pipe or a spring plate.

In the above structure, an end of the diaphragm cushion 4.2 close to the gas outlet 2.2 is sunken downward to form the first locating groove 9; at this time, the limiting boss 4.2.1 is formed on an outer side wall of the sunken first locating groove 9. In this structure, the body of the diaphragm cushion 4.2, the first locating groove 9 and the limiting boss 4.2.1 may be formed integrally. The diaphragm cushion 4.2 in this structure may be made of a metal material, or a plastic material with high strength. When the plastic material is adopted, one-time injection molding may be directly performed. Therefore, the batch production can be carried out conveniently at lower costs.

Furthermore, since the overall thickness of the diaphragm cushion 4.2 is small, in order to ensure the structural strength of the diaphragm cushion 4.2, the circumferential outer edge at a side of the diaphragm cushion 4.2 away from the rubber diaphragm 4.1 is folded upward to form an annular retaining rim 4.2.3, and a reinforcing protrusion rib 4.2.4 is disposed inside the retaining rim 4.2.3 on the diaphragm cushion 4.2. As shown in FIG. 2, a plurality of reinforcing protrusion ribs 4.2.4 crossed mutually are convexly disposed at an inner wall of the retaining rim 4.2.3 to effectively ensure the bottom strength of the diaphragm cushion 4.2.

The above descriptions are made to the preferred embodiments of the present invention but shall not be understood as limiting of the claims. The present invention is not limited to the above embodiments and the specific structures are allowed to change. Various changes made within the scope of protection claimed by the independent claims of the present invention shall all fall within the scope of protection of the present invention.

We claim:

1. A gas pressure regulating device, comprising an upper housing (1) and a lower housing (2), a pressure regulation cavity (3) is disposed between the upper housing (1) and the lower housing (2), a diaphragm assembly (4) is disposed in the pressure regulation cavity (3), a gas inlet (2.1) and a valve port (2.3) for communicating the gas inlet (2.1) with the pressure regulation cavity (3) are disposed at one end of the lower housing (2), a gas outlet (2.2) in communication with the pressure regulation cavity (3) is disposed at the other end of the lower housing (2), wherein a first supporting point (5) is disposed at an end of the lower housing (2) close to the valve port (2.3), a second supporting point (6) is disposed at a position of the upper housing (1) opposing the first supporting point (5), one end of the diaphragm assembly (4) passes through a passage between the first supporting point (5) and the second supporting point (6) to connect with a side wall of one end of the pressure regulation cavity (3), and the other end of the diaphragm assembly (4) is connected at a side wall of the other end of the pressure regulation cavity (3); the diaphragm assembly (4) can rotate around the first supporting point (5) or the second supporting point (6) to regulate an openness of the valve port (2.3), and an elastic resetting member (7) is disposed between an end of the diaphragm assembly (4) away from the valve port (2.3) and the upper housing (1).

2. The gas pressure regulating device of claim 1, wherein a mounting step (8) extending toward the pressure regulation cavity (3) is disposed at an end of the lower housing (2) close to the gas inlet (2.1), and the valve port (2.3) is convexly disposed at one end of the mounting step (8) close to the gas inlet (2.1); the first supporting point (5) is convexly disposed at the other end of the mounting step (8).

3. The gas pressure regulating device of claim 1, wherein the first supporting point (5) and the second supporting point (6) are staggeredly disposed along an inlet incoming direction, and the second supporting point (6) is located between the valve port (2.3) and the first supporting point (5) along the inlet incoming direction.

4. The gas pressure regulating device of claim 1, wherein the diaphragm assembly (4) comprises a rubber diaphragm (4.1) and a diaphragm cushion (4.2), and the diaphragm cushion (4.2) is covered on the top of the rubber diaphragm (4.1); an area of the diaphragm cushion (4.2) is smaller than that of the rubber diaphragm (4.1), and a circumferential outer edge of the rubber diaphragm (4.1) is connected at a side wall of the pressure regulation cavity (3).

5. The gas pressure regulating device of claim 4, wherein a limiting boss (4.2.1) is convexly disposed at a lower surface of an end of the diaphragm cushion (4.2) close to the gas outlet (2.1), and a limiting groove (4.1.1) mated with the limiting boss (4.2.1) is disposed on the rubber diaphragm (4.1), and at least one locating assembly is disposed between the rubber diaphragm (4.1) and the diaphragm cushion (4.2).

6. The gas pressure regulating device of claim 5, wherein the locating assembly comprises a locating column (4.1.2) integrally formed on the rubber diaphragm (4.1), and a locating hole (4.2.2) mated with the locating column (4.1.2) is disposed on the diaphragm cushion (4.2).

7. The gas pressure regulating device of claim 4, wherein the circumferential outer edge at a side of the diaphragm cushion (4.2) away from the rubber diaphragm (4.1) is folded upward to form a retaining rim (4.2.3), and a reinforcing protrusion rib (4.2.4) is disposed in the retaining rim (4.2.3) on the diaphragm cushion (4.2).

8. The gas pressure regulating device of claim 5, wherein a first locating groove (9) is formed by recessing a side of the limiting boss (4.2.1) away from the rubber diaphragm (4.1); a second locating groove (10) corresponding to the first locating groove (9) is disposed at an inner sidewall of the upper housing (1), and both ends of the elastic resetting member (7) are fitted into the first locating groove (9) and the second locating groove (10) respectively.

9. The gas pressure regulating device of claim 8, wherein the elastic resetting member (7) is a cylindrical spring.

* * * * *